A. GARDON.
FIELD STRAW RACK.
APPLICATION FILED JULY 11, 1919.
1,319,060.  Patented Oct. 21, 1919.
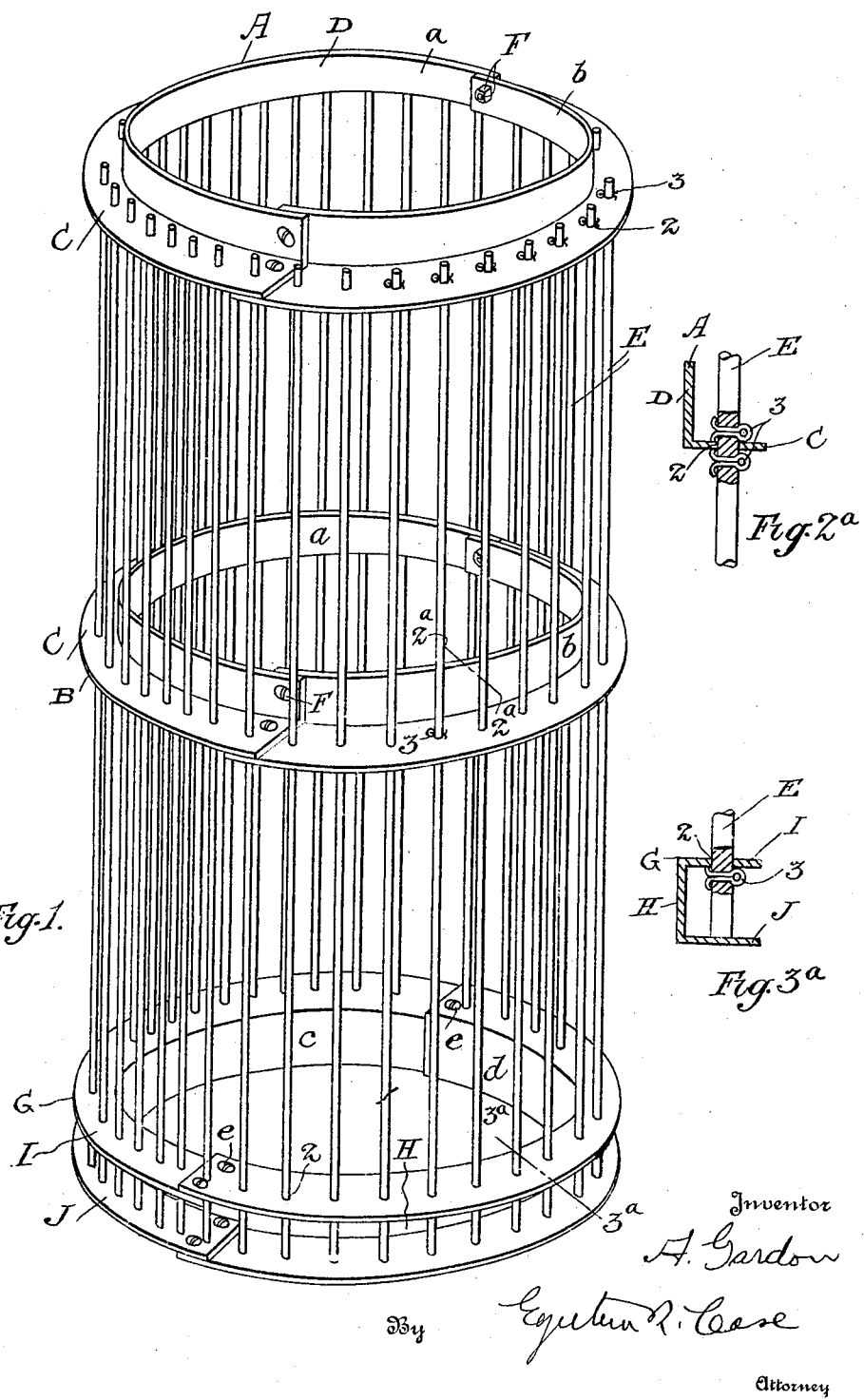

UNITED STATES PATENT OFFICE.

AMBROISE GARDON, OF PETERSON, SASKATCHEWAN, CANADA.

FIELD STRAW-RACK.

1,319,060.   Specification of Letters Patent.   Patented Oct. 21, 1919.

Application filed July 11, 1919. Serial No. 310,102.

*To all whom it may concern:*

Be it known that I, AMBROISE GARDON, of the town of Peterson, Province of Saskatchewan, Dominion of Canada, have invented certain new and useful Improvements in Field Straw-Racks, of which the following is a specification.

My invention relates to improvements in racks, and relates more particularly to the production of a rack to be used out in the open, and the object of my invention is to provide a rack for field use which can be placed on any suitable conveyance according to the season of the year and transported to the required location in a field, either for loading purposes or for feeding purposes. Another object of the invention is to construct the rack so as to permit the same to be readily demounted for transporation and storage, and the construction of my invention in its preferred form will be hereinafter particularly set forth, and what I claim as new will be pointed out in the claim forming part of this specification.

Figure 1 is a perspective view of my rack. Fig. 2$^a$ is a vertical cross section on the line 2$^a$—2$^a$, Fig. 1, and Fig. 3$^a$ is a cross section on the line 3$^a$—3$^a$, Fig. 1.

In the drawings, like characters of reference refer to the same parts.

It is a very common practice to throw the straw after threshing on to the ground, and as threshing often occurs in the vicinity of a barn yard, a great deal of injurious foreign matter becomes mixed with the straw, not only rendering it unhealthful for feeding purposes, but also largely destroying its utility for bedding purposes.

Now by means of a rack embodying the principle of my invention, the straw can be delivered by the blower into the rack during threshing and as many of these racks as may be required, may be employed. The bars composing the vertical members of the rack are far enough apart to permit feeding animals to have access to the straw or other fodder.

The rack in its preferred form comprises upper and lower ring-plates A and B, each composed of two section $a$ and $b$. Each ring-plate section comprises a horizontal flange C, and a vertical flange D. Extending through the horizontal flanges C are a plurality of bars E made of any suitable material.

The opposing ends of the ring-plate sections $a$ and $b$ overlap as shown clearly at the top of Fig. 1, and are secured together by nuts and bolts designated by the common numeral of reference F, so that these sections may be readily taken apart or coupled together.

The bottom ring-plate G is made of two ring-plate sections $c$ and $d$, the ends of which overlap as shown, and are secured together by any suitable fastening means such as bolts $e$. The ring-plate G is preferably U-shaped in cross section as shown in Fig. 3$^a$, and each ring-plate section $c$ and $d$, comprises a vertical flange H, and two horizontal flanges I and J. The bars E are held in holes 2, formed in the flanges C and I, and rest at their lower ends against the bottom flange J. Suitable removable fastening means, such as split pins 3, are held in the bars E, preferably above and below each horizontal flange C, and underneath the flanges I.

It will, of course, be understood that the rack may be made of any desired capacity, and in all essential particulars the rack comprises the bottom ring-plate G, and the middle ring-plate C, together with the bars held therein.

The horizontal flanges C, I and J, provide suitable supports for the bars E, and the vertical flanges D and flanges H stiffen the said ring-plate, and so provide the necessary strength.

The bottom flange J prevents the bars A from coming into contact with the ground, and provide a ready means for mounting the rack on a sleigh (not shown) for instance.

Without further elaboration it will be understood that this rack can be readily demounted and set up without much trouble.

What I claim is,

A rack comprising a top ring-plate composed of two sections, each section comprising a horizontal flange and a vertical flange; means whereby said sections are demountably coupled together; a bottom ring-plate comprising two sections each composed of upper and lower horizontal flanges coupled together by a vertical flange; means whereby said sections are demountably coupled together, and a plurality of spaced bars mounted in certain of said horizontal flanges, and means whereby the said bars are demountably held in place.

<div style="text-align:right">AMBROISE GARDON.</div>

<div style="text-align:center">Copies of this patent may be obtained for five cents each, by addressing the "Commissioner of Patents, Washington, D. C."</div>